US011119560B2

(12) United States Patent
Kaza et al.

(10) Patent No.: US 11,119,560 B2
(45) Date of Patent: Sep. 14, 2021

(54) TECHNIQUES FOR REDUCING POWER CONSUMPTION

(71) Applicant: QUALCOMM Incorporated, San Diego, CA (US)

(72) Inventors: Kameshwar Krishna Kaza, San Jose, CA (US); Koushik Annapureddy, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/791,794

(22) Filed: Oct. 24, 2017

(65) Prior Publication Data
US 2019/0121420 A1    Apr. 25, 2019

(51) Int. Cl.
G06F 1/3234    (2019.01)
G09G 5/10      (2006.01)
G09G 5/14      (2006.01)
G06F 1/3212    (2019.01)
G06F 1/3293    (2019.01)
G06F 3/01      (2006.01)
G06F 1/3218    (2019.01)
G06F 1/3231    (2019.01)
G06F 1/16      (2006.01)
G06F 1/3206    (2019.01)

(52) U.S. Cl.
CPC .......... G06F 1/3265 (2013.01); G06F 1/1684 (2013.01); G06F 1/3206 (2013.01); G06F 1/3212 (2013.01); G06F 1/3218 (2013.01); G06F 1/3231 (2013.01); G06F 1/3293 (2013.01); G06F 3/013 (2013.01); G09G 5/10 (2013.01); G09G 5/14 (2013.01); G09G 2320/0613 (2013.01); G09G 2320/0626 (2013.01); G09G 2320/0666 (2013.01); G09G 2320/0686 (2013.01); G09G 2330/021 (2013.01); G09G 2354/00 (2013.01)

(58) Field of Classification Search
None
See application file for complete search history.

(56) References Cited

U.S. PATENT DOCUMENTS

2005/0052446 A1    3/2005   Plut et al.
2011/0287811 A1*  11/2011   Mattila .............. G06T 19/006
                                             455/566
2011/0304536 A1   12/2011   Chen et al.
2013/0157646 A1*   6/2013   Ferren ................ G06F 1/3265
                                             455/418

(Continued)

OTHER PUBLICATIONS

International Search Report and Written Opinion—PCT/US2018/056742—ISA/EPO—dated Dec. 11, 2018.

Primary Examiner — YuJang Tswei
(74) Attorney, Agent, or Firm — Qualcomm Incorporated

(57) ABSTRACT

Disclosed is a method and apparatus for power saving techniques. The method may include identifying at least one portion of the display, associated with an application, that may be adjusted, wherein the at least one portion of the display is less than an entire area of the application. Furthermore, the method may include, determining one or more parameters for the identified at least one portion of the display. Additionally, the method may include adjusting the identified at least one portion of the display based on the one or more parameters.

30 Claims, 8 Drawing Sheets

(56) References Cited

U.S. PATENT DOCUMENTS

| | | | |
|---|---|---|---|
| 2014/0063061 A1* | 3/2014 | Reitan | G09G 3/003 345/633 |
| 2015/0042571 A1* | 2/2015 | Lombardi | G06F 1/3293 345/173 |
| 2016/0162241 A1* | 6/2016 | An | G06F 3/1423 345/1.3 |
| 2017/0115722 A1* | 4/2017 | Chen | G06F 1/3212 |
| 2018/0314066 A1* | 11/2018 | Bell | G09G 5/10 |

* cited by examiner

TECHNIQUES FOR REDUCING POWER CONSUMPTION

FIELD

This disclosure relates generally to methods, devices, and computer readable medium for power saving techniques and more particularly to methods and apparatuses for reducing display power consumption during usage of one or more applications.

BACKGROUND

Current display technologies such as Liquid Crystal Displays (LCD) use a single backlight to run the entire display. As a result, these displays need to make sacrifices to the user input/user experience and/or to adjust parameters for the entire display to reduce power consumption.

For example, an application may use fewer colors and more black and gray color tones causing the backlight to run in a lower power mode and thereby reducing power; however, because the backlight is still running the power consumption only slightly reduced. As a result, there is a tradeoff between power consumption and user experience when each application is developed.

Additionally, some power savings techniques utilize sensors such as an ambient light sensor to detect the brightness of a room and adjust the brightness of the entire display based on the measurements from the ambient light sensor.

More recent developments with displays made with light emitting diodes (LED) and organic light emitting diodes (OLED) do not have an independent backlight. These displays emit light at the pixel level rather than using an independent backlight. However, conventional power saving techniques are still used with these new displays.

Currently, many applications may include content that does not always have to be shown to the user or has blank spaces for aesthetic purposes; however, that content or blank spaces may inadvertently be causing the mobile device to be using more power. For example, during navigation the mobile device's screen displays the route but also nearby streets and/or annotations of landmarks or points of interest and this is displayed at a consistent normal power level even though the user may only care about the route. In another example, a reading application may display a book's contents but the words may be black text but the background, spacing and margins are all white so in cases where the display is an OLED the white pixels from the margins may needlessly cause wasted power consumption.

SUMMARY

An example of a method for power saving techniques for a display may include identifying at least one portion of the display, associated with an application, that may be adjusted, wherein the at least one portion of the display is less than an entire area of the application. Furthermore, the method may include, determining one or more parameters for the identified at least one portion of the display. Additionally, the method may include adjusting the identified at least one portion of the displayed based on the one or more parameters.

An example of a mobile device for power saving techniques may include a display, memory and one or more processors coupled to the memory and the display, the one or more processors configured identify at least one portion of the display, associated with an application, that may be adjusted, wherein the at least one portion of the display is less than an entire area of the application. Furthermore, the one or more processors may be configured to determine one or more parameters for the identified at least one portion of the display. Additionally, the one or more processors may be configured to adjust the identified at least one portion of the displayed based on the one or more parameters.

An example of a mobile device for power saving techniques may include means for obtaining an indication for a power mode. The mobile device may include means for identifying at least one portion of the display, associated with an application, that may be adjusted, wherein the at least one portion of the display is less than an entire area of the application. Furthermore, the mobile device may include means for determining one or more parameters for the identified at least one portion of the display. Additionally, the mobile device may include means for adjusting the identified at least one portion of the displayed based on the one or more parameters.

An example non-transitory computer-readable medium for power saving techniques includes processor-readable instructions configured to cause a processor to obtain an indication for a power mode. The processor-readable instructions configured to cause a processor to identify at least one portion of the display, associated with an application, that may be adjusted, wherein the at least one portion of the display is less than an entire area of the application. Furthermore, the processor-readable instructions configured to cause a processor to determine one or more parameters for the identified at least one portion of the display. Additionally, the processor-readable instructions configured to cause a processor to adjust the identified at least one portion of the displayed based on the one or more parameters.

BRIEF DESCRIPTION OF DRAWINGS

Non-limiting and non-exhaustive aspects are described with reference to the following figures, wherein like reference numerals refer to like parts throughout the various figures unless otherwise specified.

DETAILED DESCRIPTION

References throughout this specification to one implementation, an implementation, an embodiment, and/or the like mean that a particular feature, structure, characteristic, and/or the like described in relation to a particular implementation and/or embodiment is included in at least one implementation and/or embodiment of claimed subject matter. Thus, appearances of such phrases, for example, in various places throughout this specification are not necessarily intended to refer to the same implementation and/or embodiment or to any one particular implementation and/or embodiment. Furthermore, it is to be understood that particular features, structures, characteristics, and/or the like described are capable of being combined in various ways in one or more implementations and/or embodiments and, therefore, are within intended claim scope. However, these and other issues have a potential to vary in a particular context of usage. In other words, throughout the disclosure, particular context of description and/or usage provides helpful guidance regarding reasonable inferences to be drawn; however, likewise, "in this context" in general without further qualification refers to the context of the present disclosure.

The features and advantages of the disclosed method and apparatus will become more apparent to those skilled in the art after considering the following detailed description in connection with the accompanying drawing.

System and techniques herein provide for an intelligent power saving techniques for a display.

Figure 1:
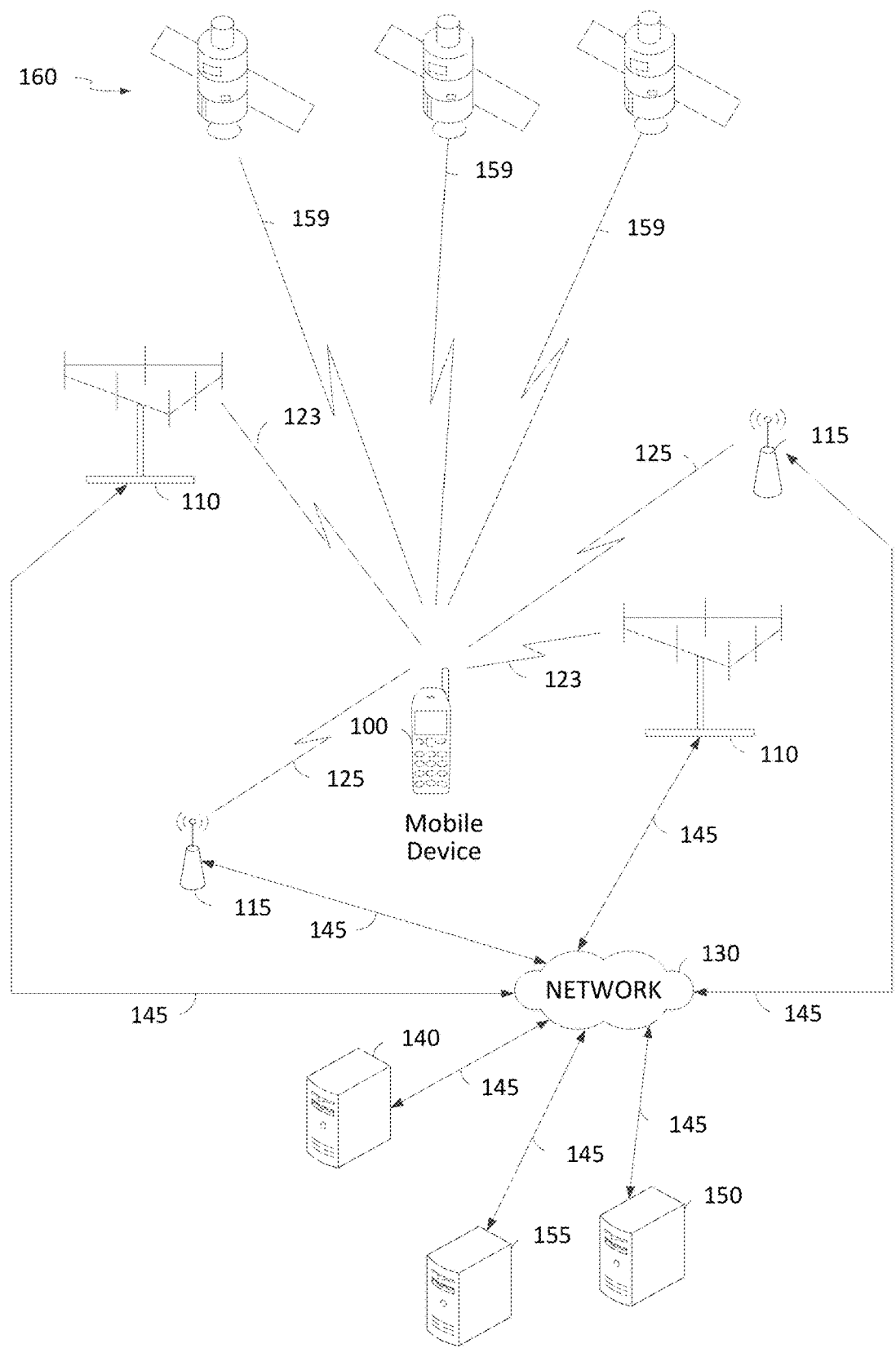
FIG. 1 shows an example of a communication environment in which various aspects of the disclosure may be implemented.

As shown in FIG. 1 in a particular implementation, mobile device 100, which may also be referred to as a UE (or user equipment), may transmit radio signals to, and receive radio signals from, a wireless communication network. In one example, mobile device 100 may communicate with a cellular communication network by transmitting wireless signals to, or receiving wireless signals from a cellular transceiver 110 which may comprise a wireless base transceiver subsystem (BTS), a Node B or an evolved NodeB (eNodeB) over wireless communication link 123. Similarly, mobile device 100 may transmit wireless signals to, or receive wireless signals from local transceiver 115 over wireless communication link 125. A local transceiver 115 may comprise an access point (AP), femtocell, Home Base Station, small cell base station, Home Node B (HNB) or Home eNodeB (HeNB) and may provide access to a wireless local area network (WLAN, e.g., IEEE 802.11 network), a wireless personal area network (WPAN, e.g., Bluetooth® network) or a cellular network (e.g. an LTE network or other wireless wide area network such as those discussed in the next paragraph). Of course, these are merely examples of networks that may communicate with a mobile device over a wireless link, and claimed subject matter is not limited in this respect.

Examples of network technologies that may support wireless communication link 123 are Global System for Mobile Communications (GSM), Code Division Multiple Access (CDMA), Wideband CDMA (WCDMA), Long Term Evolution LTE), High Rate Packet Data (HRPD). GSM, WCDMA and LTE are technologies defined by 3GPP. CDMA and HRPD are technologies defined by the 3$^{rd}$ Generation Partnership Project 2 (3GPP2). WCDMA is also part of the Universal Mobile Telecommunications System (UMTS) and may be supported by an HNB. Cellular transceivers 110 may comprise deployments of equipment providing subscriber access to a wireless telecommunication network for a service (e.g., under a service contract). Here, a cellular transceiver 110 may perform functions of a cellular base station in servicing subscriber devices within a cell determined based, at least in part, on a range at which the cellular transceiver 110 is capable of providing access service. Examples of radio technologies that may support wireless communication link 125 are IEEE 802.11, Bluetooth (BT) and LTE.

In a particular implementation, cellular transceiver 110 and local transceiver 115 may communicate with servers 140, 150 and/or 155 over a network 130 through links 145. Here, network 130 may comprise any combination of wired or wireless links and may include cellular transceiver 110 and/or local transceiver 115 and/or servers 140, 150 and 155. In a particular implementation, network 130 may comprise Internet Protocol (IP) or other infrastructure capable of facilitating communication between mobile device 100 and servers 140, 150 or 155 through local transceiver 115 or cellular transceiver 110. Network 130 may also facilitate communication between mobile device 100, servers 140, 150 and/or 155 and a public safety answering point (PSAP) 160, for example through communications link 165). In an implementation, network 130 may comprise cellular communication network infrastructure such as, for example, a base station controller or packet based or circuit based switching center (not shown) to facilitate mobile cellular communication with mobile device 100. In a particular implementation, network 130 may comprise local area network (LAN) elements such as WLAN APs, routers and bridges and may in that case include or have links to gateway elements that provide access to wide area networks such as the Internet. In other implementations, network 130 may comprise a LAN and may or may not have access to a wide area network but may not provide any such access (if supported) to mobile device 100. In some implementations network 130 may comprise multiple networks (e.g., one or more wireless networks and/or the Internet). In one implementation, network 130 may include one or more serving gateways or Packet Data Network gateways. In addition, one or more of servers 140, 150 and 155 may be an E-SMLC, a Secure User Plane Location (SUPL) Location Platform (SLP), a SUPL Location Center (SLC), a SUPL Positioning Center (SPC), a Position Determining Entity (PDE) and/or a gateway mobile location center (GMLC), each of which may connect to one or more location retrieval functions (LRFs) and/or mobility management entities (MMEs) in network 130.

In particular implementations, and as discussed below, mobile device 100 may have circuitry and processing resources capable of obtaining location related measurements (e.g. for signals received from GPS or other Satellite Positioning System (SPS) satellites 114, cellular transceiver 110 or local transceiver 115 and possibly computing a position fix or estimated location of mobile device 100 based on these location related measurements. In some implementations, location related measurements obtained by mobile device 100 may be transferred to a location server such as an enhanced serving mobile location center (E-SMLC) or SUPL location platform (SLP) (e.g. which may be one of servers 140, 150 and 155) after which the location server may estimate or determine a location for mobile device 100 based on the measurements. In the presently illustrated example, location related measurements obtained by mobile device 100 may include measurements of signals (124) received from satellites belonging to an SPS or Global Navigation Satellite System (GNSS) such as GPS, GLONASS, Galileo or Beidou and/or may include measurements of signals (such as 123 and/or 125) received from terrestrial transmitters fixed at known locations (e.g., such as cellular transceiver 110). Mobile device 100 or a separate location server may then obtain a location estimate for mobile device 100 based on these location related measurements using any one of several position methods such as, for example, GNSS, Assisted GNSS (A-GNSS), Advanced Forward Link Trilateration (AFLT), Observed Time Difference Of Arrival (OTDOA) or Enhanced Cell ID (E-CID) or combinations thereof. In some of these techniques (e.g. A-GNSS, AFLT and OTDOA), pseudoranges or timing differences may be measured at mobile device 100 relative to three or more terrestrial transmitters fixed at known locations or relative to four or more satellites with accurately known orbital data, or combinations thereof, based at least in part, on pilots, positioning reference signals (PRS) or other positioning related signals transmitted by the transmitters or satellites and received at mobile device 100. Here, servers 140, 150 or 155 may be capable of providing positioning assistance data to mobile device 100 including, for example, information regarding signals to be measured (e.g., signal timing), locations and identities of terrestrial transmitters and/or signal, timing and orbital information for GNSS satellites to facilitate positioning techniques such as A-GNSS, AFLT, OTDOA and E-CID. For example, servers 140, 150 or 155 may comprise an almanac which indicates locations and identities of cellular transceivers and/or local transceivers in a particular region or regions such as a particular venue, and may provide information descriptive of signals transmitted by a cellular base station or AP such as transmission power and signal timing. In the case of E-CID, a mobile device 100 may obtain measurements of signal strengths for signals received from cellular transceiver 110 and/or local transceiver 115 and/or may obtain a round trip signal propagation time (RTT) between mobile device 100 and a cellular transceiver 110 or local transceiver 115. A mobile device 100 may use these measurements together with assistance data (e.g. terrestrial almanac data or GNSS satellite data such as GNSS Almanac and/or GNSS Ephemeris information) received from a server 140, 150 or 155 to determine a location for mobile device 100 or may transfer the measurements to a server 140, 150 or 155 to perform the same determination.

A mobile device (e.g. mobile device 100 in FIG. 1) may be referred to as a device, a wireless device, a mobile terminal, a terminal, a mobile station (MS), a user equipment (UE), a SUPL Enabled Terminal (SET) or by some other name and may correspond to a cellphone, smartphone, laptop, tablet, PDA, tracking device or some other portable or moveable device. Typically, though not necessarily, a mobile device may support wireless communication such as using GSM, WCDMA, LTE, CDMA, HRPD, WiFi, BT, WiMax, etc. A mobile device may also support wireless communication using a wireless LAN (WLAN), DSL or packet cable for example. A mobile device may comprise a single entity or may comprise multiple entities such as in a personal area network where a user may employ audio, video and/or data I/O devices and/or body sensors and a separate wireline or wireless modem. An estimate of a location of a mobile device (e.g., mobile device 100) may be referred to as a location, location estimate, location fix, fix, position, position estimate or position fix, and may be geographic, thus providing location coordinates for the mobile device (e.g., latitude and longitude) which may or may not include an altitude component (e.g., height above sea level, height above or depth below ground level, floor level or basement level). Alternatively, a location of a mobile device may be expressed as a civic location (e.g., as a postal address or the designation of some point or small area in a building such as a particular room or floor). A location of a mobile device may also be expressed as an area or volume (defined either geographically or in civic form) within which the mobile device is expected to be located with some probability or confidence level (e.g., 67% or 95%). A location of a mobile device may further be a relative location comprising, for example, a distance and direction or relative X, Y (and Z) coordinates defined relative to some origin at a known location which may be defined geographically or in civic terms or by reference to a point, area or volume indicated on a map, floor plan or building plan. In the description contained herein, the use of the term location may comprise any of these variants unless indicated otherwise.

Figure 2:
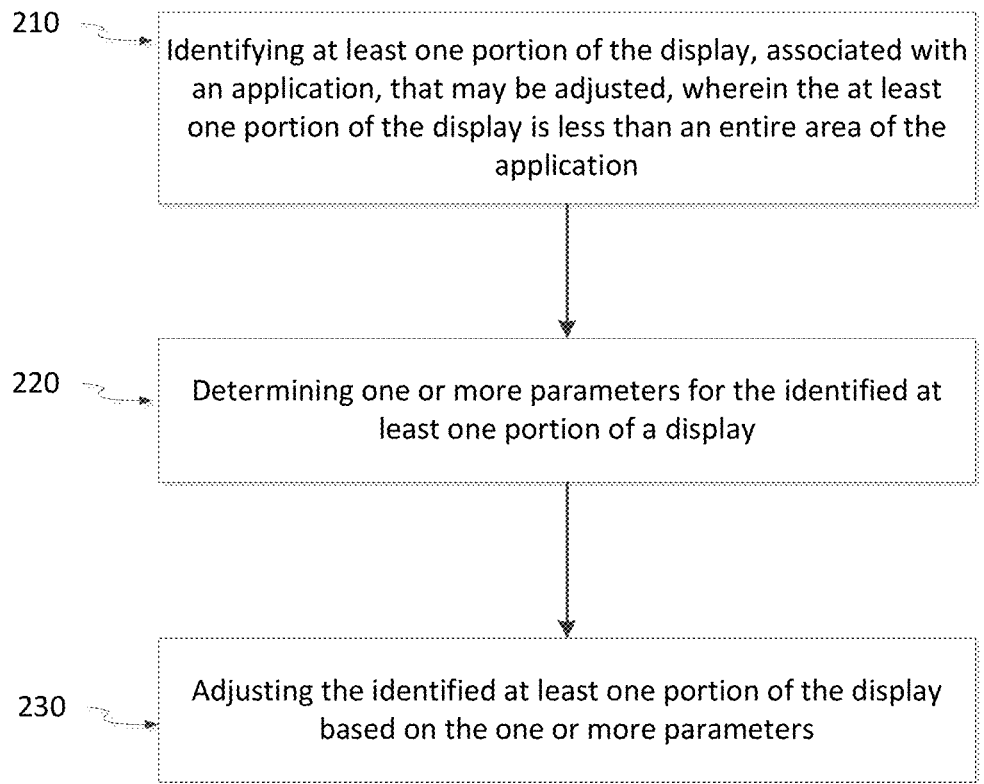
FIG. 2 shows an example process diagram illustrating a method of controlling the power of a display.

FIG. 2 is a process diagram 200 illustrating an example method of adjusting the power consumption of the display of a mobile device 100.

The mobile device 100 may cause the method in FIG. 2 to occur in a number of different ways, such as: obtaining an indication of at least one power mode, battery level, user location, preferences, user usage or any combination thereof.

In the case of a power indicator, the power mode indicator may be binary, such as on or off, or may be a range of values for the power consumption of the display. These values may be absolute values that indicate how much power consumption is allowed by the display, may indicate relative values compared to the current power consumption of the display, may indicate absolute or relative values for portions of the display or may indicate whether or not power consumption adjustments are needed or not.

The power indicator may be provided by user input or one or more triggers. For example, the user may specifically select an option to adjust power. The user input may be user interactions, such as touch, voice, gestures, visual gestures, facial features, auditory commands/gestures (such as tones, tapping, etc) or any combination thereof. In a simple example, the user may select a power saving mode option via the touch screen which sets the power indicator. In another example, the mobile device 100 may already be in a power savings mode and running a navigation application, but the user keeps looking at the mobile device 100, which may indicate the power savings were too aggressive so the mobile device 100 may use the frequency of the user looking at the mobile device 100 to increase the power indicator.

The one or more triggers may comprise where the user is looking, an object that may cause a glare on the screen, time not in use, location, battery level or any combination thereof. As an example, these triggers may be user settings that enable power savings when not in use. Currently, mobile devices enable display power savings based on the last time the device was used in combination with a timer; however, power savings may be further optimized based on the triggers stipulated above but may also improve user experience.

In an implementation, one or more visual sensors may track where the user is looking and may send a power indicator accordingly. For example, if the user hasn't looked at the mobile device in the last five minutes, this may trigger the power indicator to indicate the need for a power savings mode. In another example, if the user is looking at a particular portion of the mobile, the power indicator may indicate where they are looking so the mobile device may adjust the areas where the user is not looking. This may similarly be used to track glares that may occur on the screen and adjust the display accordingly, because the user may not be able to see those parts of the screen.

According to an aspect of the disclosure, there may be one or more time thresholds that may be used. The time thresholds may be based on when the user last looked at the display, when the user last used the mobile device or any combination thereof. For example, if the user is running a navigation application but hasn't looked at the display within the first time threshold, then the mobile device 100, in response to the power indicator, may adjust a portion of the display so only the user's current location and route are running at the normal power levels but the rest of the display is running at a reduce power level. When a second time threshold is met, the route outside the user's current location may be set to a reduced power level and area outside the user's location and route may be turned off. In this example, this significantly improves user experiences while also balancing it with power consumption, because in current implementations if the mobile device hasn't been used within a particular time threshold the entire display might dim for a few seconds before turning off completely.

In an implementation, the user's location may be used as a trigger for to adjust the display's power consumption. For example, similar to FIG. 3C, in the example used above for time thresholds, if the user is expected to be on a road for a long duration, it may turn off the portions of the display not associated with the user's route (similar to 350 in FIG. 3C), but the route outside the user's immediate location is left on but at a reduced power level (similar to 360 in FIG. 3C), and the route and area around the user's current location is left at normal power levels (similar to 370 in FIG. 3C).

The method described in FIG. 2 may also be triggered or started based on the device's current battery level or expected battery level. The user may have a preference threshold that is set in the mobile device, may be set by the application, may be set by the mobile device manufacturer or in any number of ways, but the current battery level or estimated battery level may be compared to this threshold to determine whether or not to proceed with the method described in FIG. 2. In the case of expected battery level, the mobile device may determine based on usage, user's expected usage or when the user starts one or more applications it may predict the user's expected battery level for a future time and it may compare that to the thresholds described above or a different threshold that may correspond to user preferences for thresholds corresponding to future battery levels and the expected battery level is compared against one or more of these threshold to determine whether or not to start with the method described herein. As an example, the user may start a navigation application but the mobile may determine based on the user's route that the mobile device will fall below a threshold value before reaching the destination so it may trigger the methods described in FIG. 2 and/or throughout the specification based on the expectation that the battery level will fall below the threshold if the methods described herein were not implemented beforehand.

Similarly, the user's location and/or user usage may be used to determine when to start the process and methods described herein. For example, if the user is far away from home and they typically use the navigation application to navigate home the mobile device may use this information to determine when to implement the methods described this specification to conserve power for potential navigation application usage.

At block 210, identifying at least one portion of the display, associated with an application, that may be adjusted. The at least one portion of the display is less than an entire area of the application. The areas of the application that are not associated with the at least one portion of the display may be kept at normal or higher power levels than the at least one portion of the display. In an implementation, the at least one portion of the display is less than an entire displayable area of the application.

The mobile device 100 may identify at least one portion of display that may be adjusted based on predefined areas, custom areas, dynamic areas or any combination thereof. The predefined areas may have a predefined shape, predefined sizes, predefined scales, starting and/or ending position either pre or post scaling of the shape. One or more applications, the operating system, display controller, processor or any combination thereof may identify at least one portion of display based on predefined areas, customer areas, dynamic areas or any combination thereof.

Figure 3A:
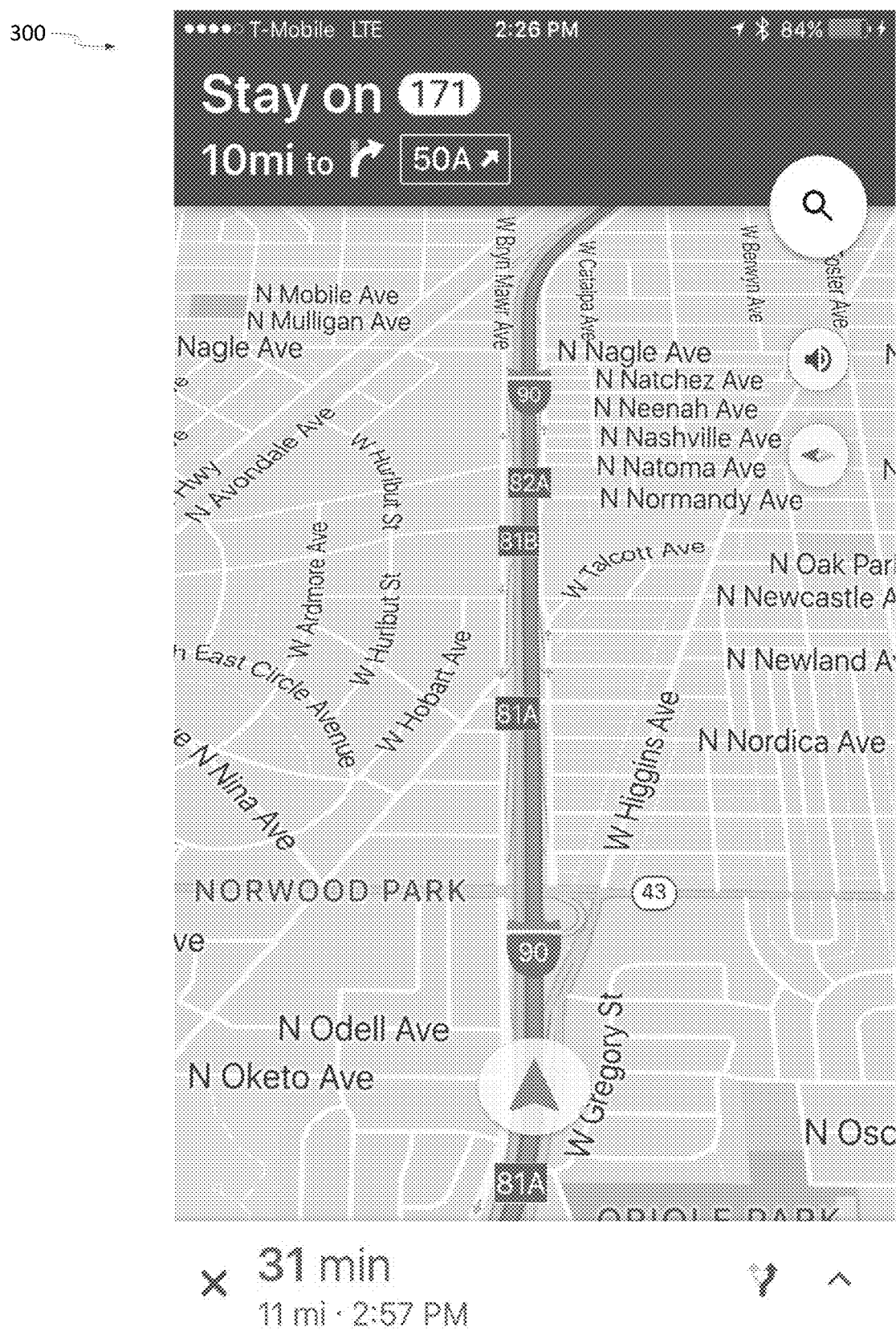
FIG. 3A is an example of a navigation application on a mobile device, wherein the navigation application is running under normal power settings.
Figure 3B:
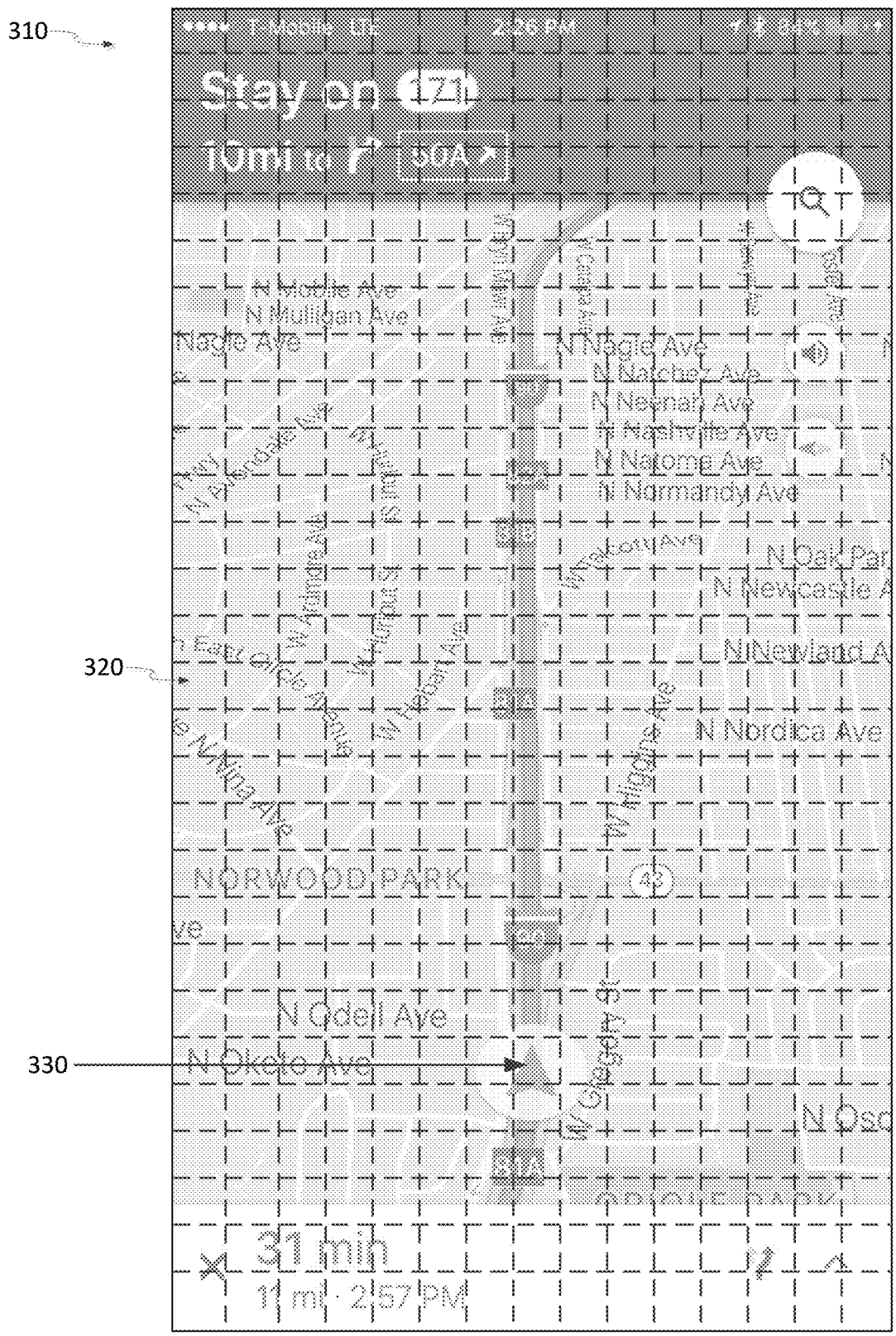
FIG. 3B is an example of a navigation application identifying one or more portions of the display that may be adjusted based on a power mode indication.

As an example, in FIG. 3B, a navigation application may identify at least one portion of the display based on a grid system, where each box corresponds to particular portion of content. This allows the application to specify how to adjust the parameters for that box. For example, the navigation application may specify that box 320 has the lowest priority to the user so when power savings are needed box 320 may be adjusted; in contrast, the navigation application may identify box 330 as being a high priority area and adjust it accordingly. The application may also use any shape, size or any combination thereof to separate and/or identify these areas. These shapes and/or sizes do not have to be standardized across each entity, and each entity may have different ways to identify these areas. These areas may be grouped and the adjusted parameters may be applied for the group.

The mobile device 100 may have identify at least one portion of the display based on custom areas. For example, a gaming application may include the user's character, so it may define all areas outside of the character as a portion of the display that may be adjusted based on the power indicator. The custom area may be static or may be dynamic. For example, in a custom static area the area doesn't change but has a custom shape, size, etc.; however, in a custom dynamic area the area does move but the shape, size, etc. stays the same.

The mobile device 100 may also identify at least one portion of the display based on dynamic areas. The dynamic areas may be based on the content of the application, location of the device or any combination thereof. For example, a navigation application may show the user's current location along with the user's route to a destination, which both may change on the display as the user continues along the route. The navigation application may provide areas outside of the user's location and the user's route as portions of the display that may be adjusted. It may also provide the user's route as a portion of the display to be adjusted if the user does not have a route change coming up within a particular distance and/or time threshold.

As an example, the content with the most importance may be a moving symbol or object that is not isolated to a specific area on the display, but instead may be anywhere on the display, so the entity may identify the one or more areas outside of the area(s) containing the moving object and may continuously update these areas. For example, in a navigation application, the user's current location and the user's route may have the highest importance and may not always be in the certain of the display, so adjust the parameters based on the user's current position and the user's route. For example, if a navigation application is running and a low power indicator is received the brightness outside of the route and the user's current location may be reduced. In another example, if a gaming application is running but the user is controlling a character that is only on a portion of the display then the area outside of that area may be adjusted based on one or more of these parameters. In another example, if the user is playing a game, it may track an area that contains the user's character including objects that can interact with the user's character.

In the implementation, where the areas are custom defined or dynamically defined, this may include the absolute coordinates that define the one or more areas or it may comprise a group of predefined shapes (along with size, starting position/ending position) and how those shapes related to one another. For example, there may be a large rectangle that is defined that contains a smaller rectangle, so the large rectangle may be the entire area that can be adjusted for lower power except for the area that is contained within the smaller rectangle. This may be implicitly related (e.g. if one completely contains the other shape then the smaller shape may be the important area to not adjust for lower power) or it may be explicitly related (and indicated as such), such as the smaller rectangle excludes an area from the large rectangle.

The one or more areas may be user defined via user input. For example, the entity may be an application and receive an indication for low power, which triggers a prompt to the user for them to define which areas of the display, that are associated with the application, may be either the most important and/or less important to the user (i.e. meaning the less important areas may be adjusted so they consume less power).

In an implementation, an entity may retrieve one or more areas that were previously user defined. For example, a navigation application may be associated with one or more user defined areas and those areas may be used to determine which portions of the display to adjust for lower power consumption.

According to an aspect of the disclosure, one or more applications may be associated with the previously user defined areas. For example, entities of the same type, such as navigation applications, may share previously user defined areas. In another example, the user may explicitly associate applications to user defined areas.

One or more sensors may be used to identify areas or portion of the display that may be adjusted so the display uses less power.

A visual sensor may be used to track a user's eyes or the direction in which they are looking to determine which areas may be adjusted. For example, if a user is utilizing a reading application, it may determine that a portion above where the user is reading and below a few lines where the user is reading are areas that can adjust to use less power by diming those areas.

A visual sensor may be used to track a user's environment to determine the impact of the environment on the user's display. For example, the user's environment may be outdoors and causes a glare on a particular portion of the screen so that area may be determined as an area to adjust to use less power. It may also make determination whether the display power can be used to overcome the glare or if the glare is too powerful to overcome in making its determination of whether to reduce the displays power in that area of the display.

The different applications may also identify areas that are more or less important to the user in different manners and does not have been standardized but they may use the same manner if they so choose or if it is specified by the operating system developer or phone manufacturer. For example, a navigation application may identify areas based on the user's route but a gaming application may identify areas based on the user's characters. Additionally, applications, operating systems, display controllers and processors also do not have to identify areas in the same manner either but may do so if they choose or if it is specified by the operating system developer or phone manufacturer.

In an implementation, a user's location may be used to determine which portions of the display may be adjusted and/or how the portions of the display may be adjusted. For example, the areas may be adjusted based on the user's location, such as if the user is in a movie theater and the application is a clock, it may automatically dim parts of the display and may even change the color of other portions of the display, such as the clock text, so it has a different color to make it less noticeable by others in the movie theater.

The user defined areas may be the areas that are the most important to the user (and indicated as such), so the areas that may be adjusted for lower power consumption may be the inverse of the user defined areas.

The entity may rank or provide a tier/priority levels for each portion/area of the display. For example, an application may provide five areas that are ranked or given tier/priority levels and another entity, such as the operating system, may determine which areas should be adjusted for lower power consumption based on the low power indicator and the ranking of each area.

The entity may indicate the visibility needed for each area. For example, there may be four areas that are provided, but two areas are allowed to have zero percent visibility, a third area may need fifty percent visibility, and a fourth area may need hundred percent visibility. In an implementation, hundred percent visibility may indicate that color adjustments are allowed, but pixels in that area are allowed to be turned off or obscured.

According to an aspect of the disclosure, the areas may also include likelihood of future use. For example, there may be five areas with one area currently being used and one area having low importance but the low importance area may have a high likelihood that it may be used at any moment based on the content, application, operating system, etc. Rather than setting this area to the lowest power settings, it may then have a more modest power setting for the area.

At block 220, determining one or more parameters for the identified at least one portion of the display. The one or more parameters may be brightness, opacity, contrast, one or more color levels, luminance, gamma, white balance or any combination thereof.

The parameters may be determined based on the content, areas, ranking and/or visibility parameters associated with the areas, or any combination thereof.

As an example, if an area is associated with an area with a low need for visibility, the mobile device 100 may reduce the brightness for the areas. If there a second area but has medium need for visibility then the mobile device 100 may determine adjust the brightness to fifty percent but it may also adjust the color levels so the area is still visible but is using lower power consumption.

The application may have access to predefined or custom patterns to use in conjunction with the one or more parameters. For example, the application may turn off pixels in a specific pattern, also known as a pixel pattern, or adjust the parameters of particular pixels in a particular pattern to converse power.

In an implementation, the parameters are used as a mask that override what is being provided by the one or more applications and/or the operating system. In this implementation, the one or more applications and/operating system provides the content as if the display is running normally and is unaware that certain portions of the display are running at a lower power. These parameters may be provided to an application, operating system, display controller, processor or any combination if it is independent from the entity providing the content. For example, if the application is providing content and areas that can be adjusted then the operating system receives and/or determines the parameters and may directly or indirectly adjust the display accordingly. If the application and the operating system are providing content and areas that can be adjusted then a display and/or display controller can receive and/or receive the parameters and directly or indirectly adjust the display accordingly.

In an implementation, the parameters may be determined and/or utilized by the entity that is providing the content. For example, a navigation application may determine how to adjust the parameters for certain portions of content that it deems are less important and it may also adjust its content and/or parameters for the content accordingly.

According to an aspect of the disclosure, if there are multiple portions of the display that may be adjusted the sets of parameters between each of the portions do not have to adjust the same parameters or the same values for those parameters. For example, if there are two portions of the display that may be adjusted the first portion may adjust the brightness to 10%, and change the color tones to gray whereas the second portion may change the color tones to blue and change the gamma value to 0.5.

At block 230, providing the content to be displayed, wherein the identified at least one portion of the display is based on the one or more parameters. The one or more parameter controls the at least one portion and the rest of the display to be controlled at least in part by the content.

The one or more parameters may be provided to a display or display controller directly so that parameters may be adjusted. This may be exposed through an interface that allows for direct control of the hardware.

The one or more parameters may be provided to an application, operating system or higher level entity that may indirectly control the display via the content that is being displayed. For example, the application and operating system may display content as if it were in normal power settings; however, the application, operating system or higher level entity may receive the low power mode indication and generate a mask based on the one or more parameters and overlay it on top of the content so the application may believe it is still outputting the content but the mask at least parts of the content.

The at least one portion of the display is displayed at a lower power level compared to an area of the application that corresponds to the application and is not part of the at least one portion of the display. As an example, in FIG. 3C, the first at least one portion of the display would be areas 350 and the parameters associated with the area would indicate to turn off pixels in areas 350, so this area would be using little to no power compared to area 370 which is using a normal or a higher power level. This is similar to area 360 which is using more power than areas 350; however, it is a second portion of the display that is also associated with the application but it running at a lower power level compared to areas 370.

The entity may indicate how much power is being saved by using the power mode indicator and how adjusting the areas and/or one or more parameters may influence the power savings of the mobile device. This may happen at any step of the method or may happen independent of the method described above.

As example, a navigation application may provide content to the operating system and the operating system may determine parameters for the identified at least one portion of the display. However, rather than directly adjusting parameters for the identified at least one portion of the display, the operating system may generate a content mask based on the parameters and may either superimpose the content mask with the content and provide the superimposed content or it may provide the content mask to the display or the display controller with the indication the content mask should be the top layer, meaning it can occlude the content. This allows the operating system to indirectly control portions of the display without having to directly specify how the portion of the display should be adjusted (e.g. without having to set parameters via a display API).

These techniques improve user experience because it priorities content that is important to the user while also balancing it with saving power. It also allows the user to choose what they deem to be important and can take into account the user's interaction in adjusting power consumption of the display.

While the FIG. 2 is described from the perspective of an application, this process may be done with multiple application where each application has its own process or in combination as a single process. This may also be done from an operating system rather than at each individual application level or it may be done in conjunction with process for applications.

FIG. 3A is an example of a mobile device 100 running a navigation application 300. This shows how the navigation application 300 should look when it is running normally without any power consumption adjustments.

FIG. 3B is an example of the navigation application 310 segregating the content into a grid-like format so it can specify which areas may be adjusted based on the power mode indication. For example, box 320 may identified as an area that may be adjusted, the need for the box to be visible is low and/or the box has little importance. However, box 330 may be identified as very important and/or the need for the box to be visible is high. As a result, when parameters are determined it may limit it to box 320 and not include box 330, so that only box 320 is adjusted but box 330 is left at its normal settings.

Figure 3C:
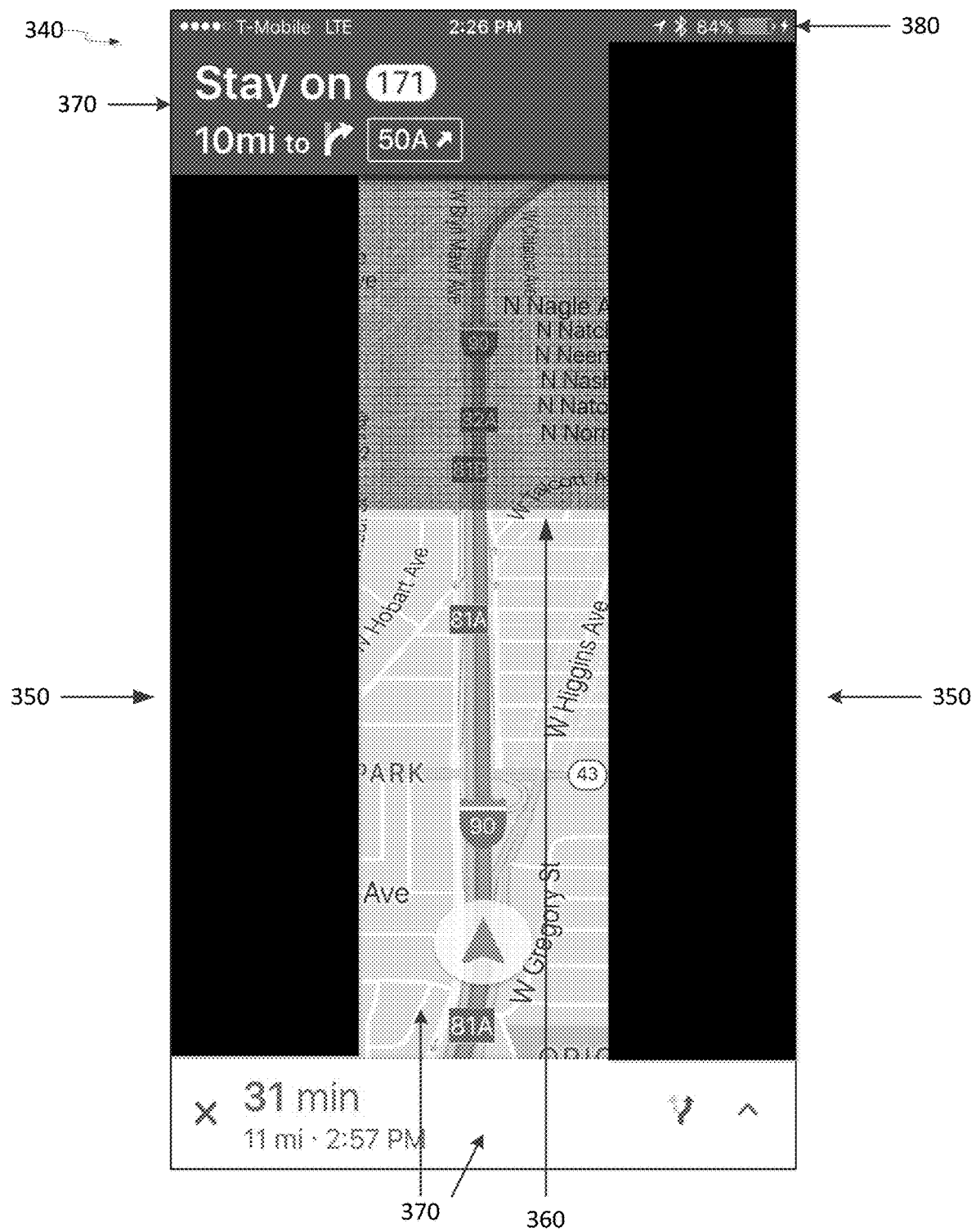
FIG. 3C is an example of a navigation application that has multiple portions of the display that have been adjusted in response to the power mode indication.

FIG. 3C continues the example of the navigation application how it is after the navigation application has been adjusted for power consumption 340. The areas 350 are turned off or greatly reduced, because they were marked as being less important or the need for visibility is low. Area 360 may have medium importance because it shows the upcoming route for the user so it may be adjusted so the opacity of the screen is at fifty percent. Opacity may be done is several ways such as turning off various pixels in that section and/or adjusting parameters for various pixel in that area. Areas 370 may have high importance and/or high visibility so those areas are left at their normal settings as provided by the application. Area 380 is content provided by the operating system so it may be determined independently from determining how to adjust the navigation application 340. In this case, the mobile device 100 may determine showing area 380 is important so it will keep it at normal power settings; however, if the power indicator specifies further need for power reduction area 380 may be an adjusted because the navigation application areas may have a higher priority to the user.

Figure 3D:
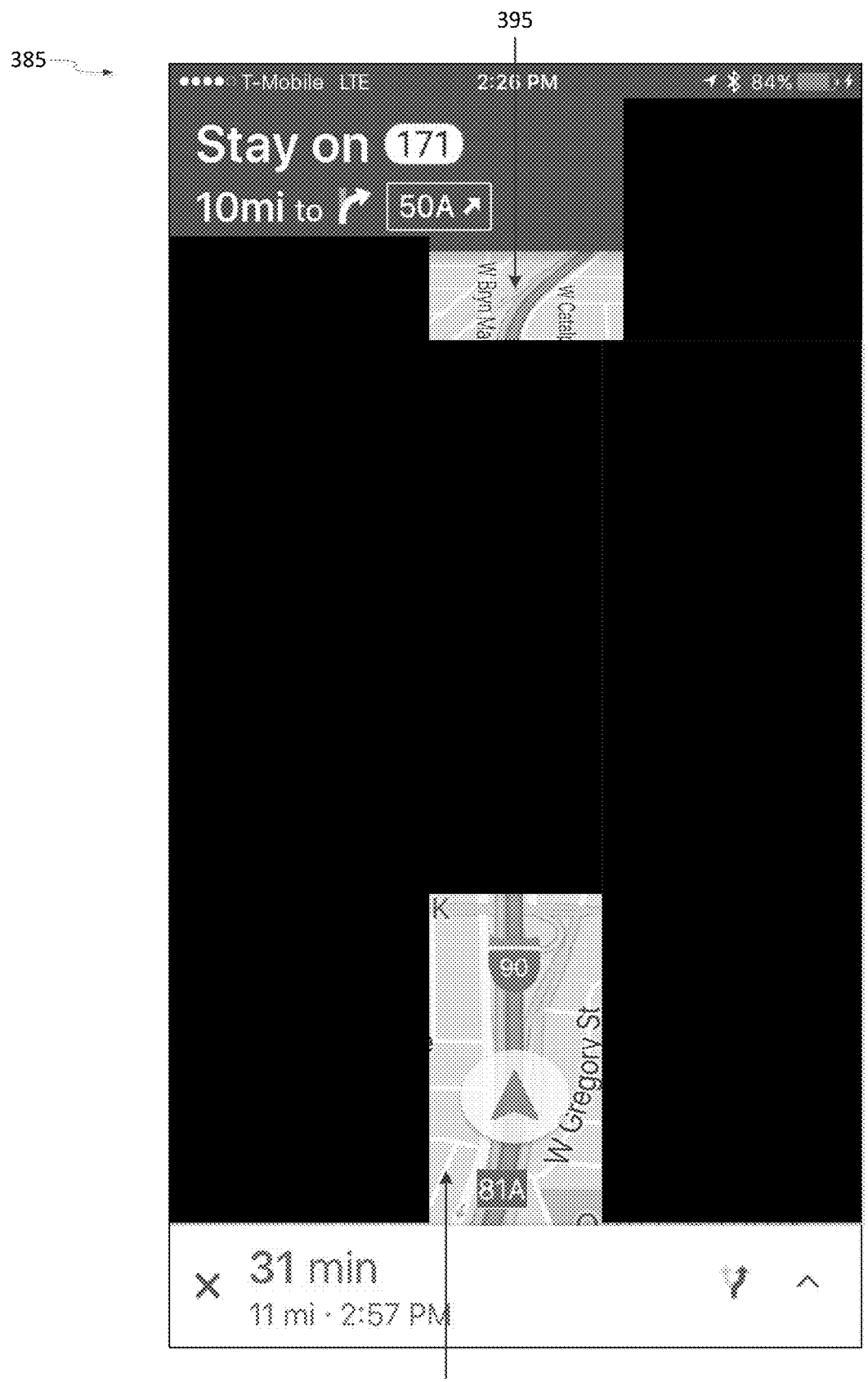
FIG. 3D is an example of a navigation application that has one or more areas adjusted to a lower power mode, and has two areas that are kept at the normal power settings.

FIG. 3D continues the example of the navigation application how it is after the navigation application has been adjusted for power consumption 385. The blacked-out areas of the display that are associated with the navigation application were the at least one portion of the display that has been adjusted to a lower power level compared to areas of the display 390, 395 that are associated with the navigation application but are not part of the at least one portion of the display. This shows that areas 390 and 395 may run at normal or higher power level and can be distinct areas. In this example, area 390 shows the user's current location along the route and area 395 may show they are continuing on the route or it may even indicate an upcoming exit the user will be taking on their route.

Figure 4A:
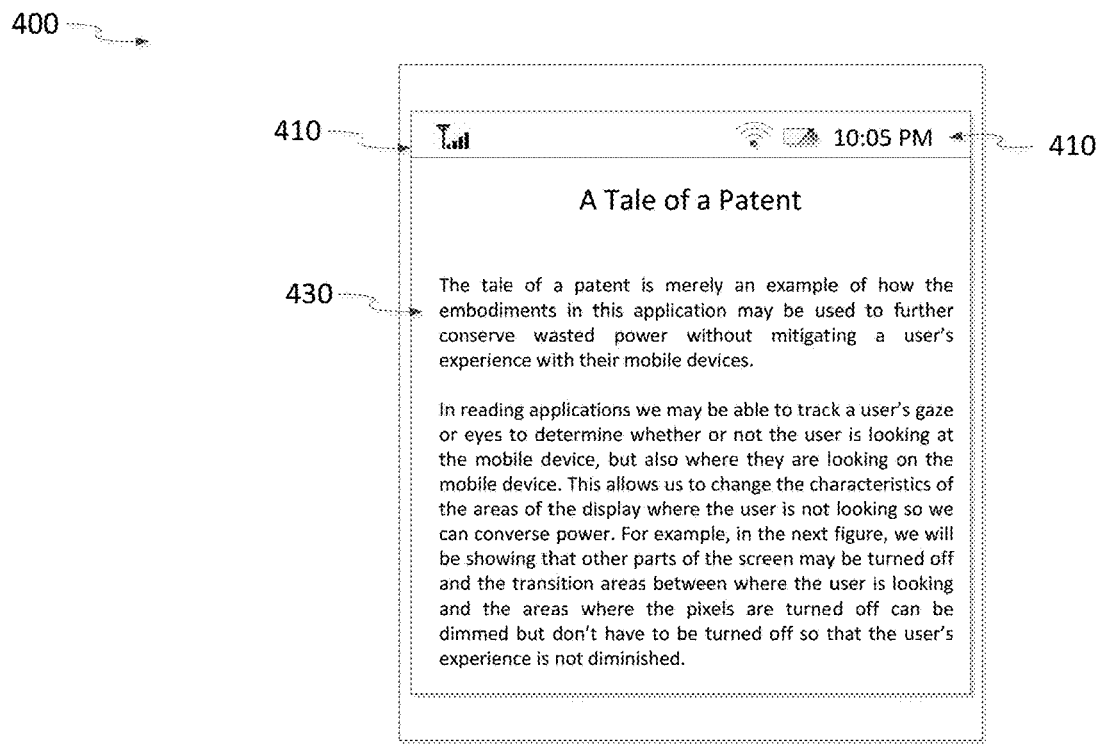
FIG. 4A is an example of a mobile's device's display running at normal power settings without any power reduction.
Figure 4B:
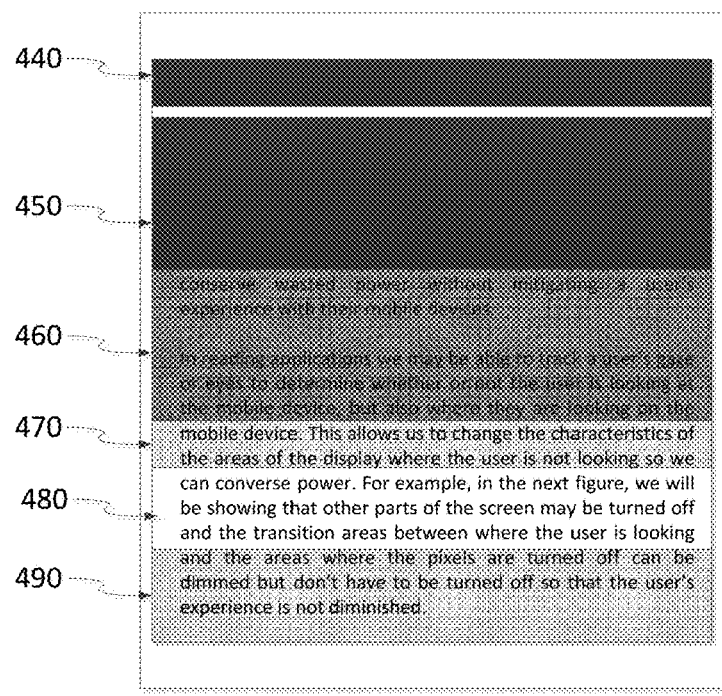
FIG. 4B is an example of a mobile device's display running after a power mode indication.

FIGS. 4A and 4B is another example of a mobile device utilizing the some of the implementations described throughout the specification. In this example, FIG. 4A shows a mobile device 400 that has a display 410 that shows a status bar 410 that is run via an operating system and a reading application 430. FIG. 4A shows a mobile device running the reading application with normal power settings (e.g. without receiving, providing or trigger a low power mode indication).

FIG. 4B shows the mobile device 400 after a low power indicator has been received and the mobile device 400 has adjusted one or more parameters for various portions of the display. As an example, an operating system may have obtained a low power indicator and determined the status bar 410 is of low importance to the user currently and that portion of the display may be turned off as shown in 440. Similarly, an application may also obtain a low power indicator and determine a user is using the reading application 430 and has passed a portion of the display awhile ago so it can turn off the portion of the display 450. The user may have recently read the sentence in section 460 and to help with the user experience it may dim the brightness of section 460. Section 470 may be the most recent section the user has read so it may be brighter than section 460 but still dimmed compared to normal power levels. The user may currently be reading section 480 and that may be at normal power settings. Section 490 is similar to section 470, and this may be a different identified portion of the display with similar parameters as section 470 or it may be a second portion of the display 490 that utilize the same parameters as section 470. This example shows there may be multiple portions of the display that are altered with different parameters and that multiple entities (operating system and an application) can use the low power indicator to alert the power consumption of various parts of the display.

Figure 5:
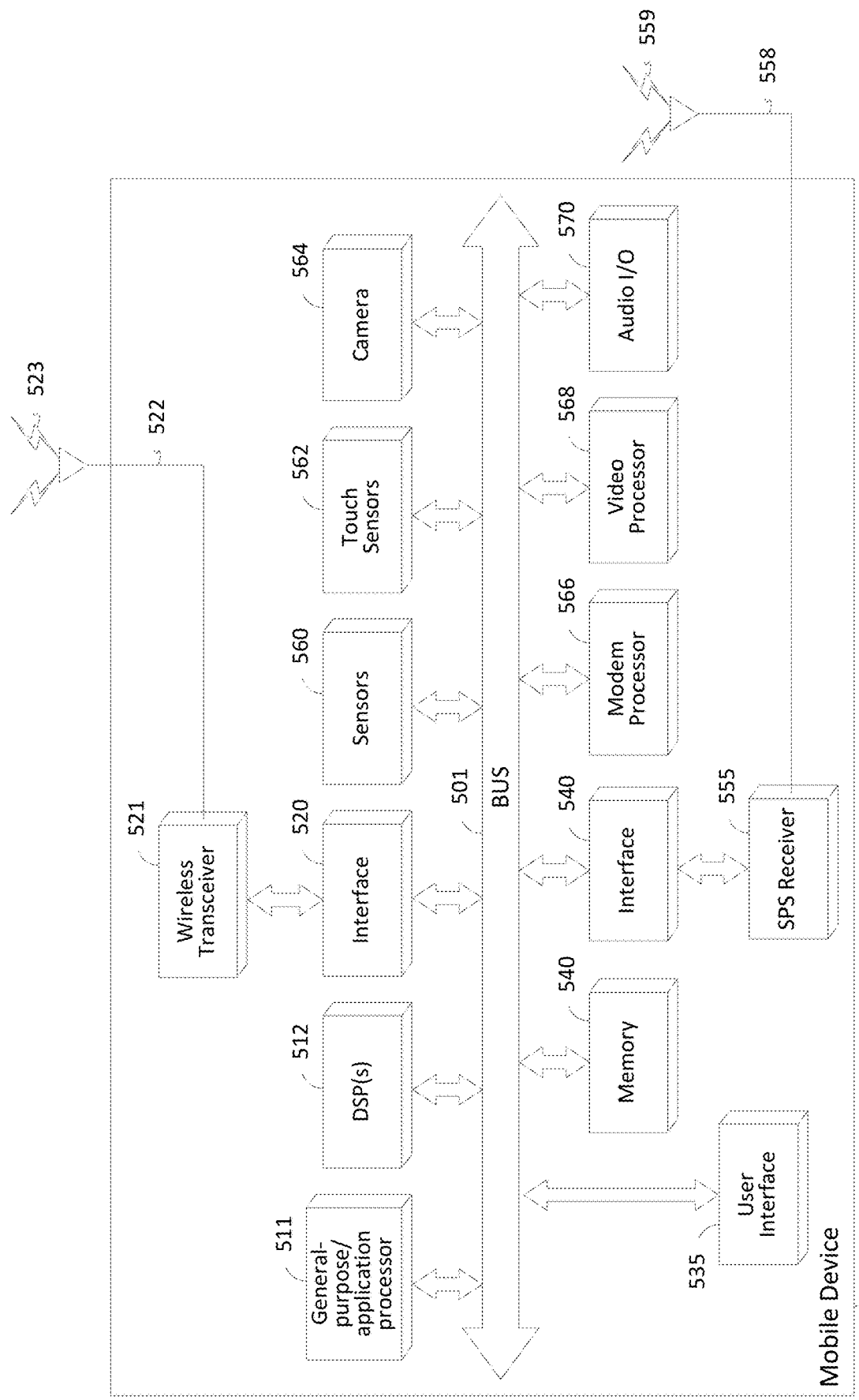
FIG. 5 is an example mobile device and the components within the mobile device in which aspects of the disclosure may be implemented.

FIG. 5 is a schematic diagram of a mobile device 500 according to an implementation. Mobile device 100 shown in FIG. 1 may comprise one or more features of mobile device 500 shown in FIG. 5. In certain implementations, mobile device 500 may comprise a wireless transceiver 521 which is capable of transmitting and receiving wireless signals 523 via wireless antenna 522 over a wireless communication network. Wireless transceiver 521 may be connected to bus 501 by a wireless transceiver bus interface 520. Wireless transceiver bus interface 520 may, in some implementations be at least partially integrated with wireless transceiver 521. Some implementations may include multiple wireless transceivers 521 and wireless antennas 522 to enable transmitting and/or receiving signals according to corresponding multiple wireless communication standards such as, for example, versions of IEEE Standard 802.11, CDMA, WCDMA, LTE, UMTS, GSM, AMPS, Zigbee, Bluetooth and a 5G or NR radio interface defined by 3GPP, just to name a few examples. In a particular implementation, wireless transceiver 521 may transmit signals on an uplink channel and receive signals on a downlink channel as discussed above.

Mobile device 500 may also comprise SPS receiver 555 capable of receiving and acquiring SPS signals 559 via SPS antenna 558 (which may be integrated with antenna 522 in some implementations). SPS receiver 555 may also process, in whole or in part, acquired SPS signals 559 for estimating a location of mobile device 500. In some implementations, general-purpose processor(s) 511, memory 540, digital signal processor(s) (DSP(s)) 512 and/or specialized processors (not shown) may also be utilized to process acquired SPS signals, in whole or in part, and/or calculate an estimated location of mobile device 500, in conjunction with SPS receiver 555. Storage of SPS or other signals (e.g., signals acquired from wireless transceiver 521) or storage of measurements of these signals for use in performing positioning operations may be performed in memory 540 or registers (not shown). General-purpose processor(s) 511, memory 540, DSP(s) 512 and/or specialized processors may provide or support a location engine for use in processing measurements to estimate a location of mobile device 500. In a particular implementation, all or portions of actions or operations set forth for process 500 may be executed by general-purpose processor(s) 511 or DSP(s) 512 based on machine-readable instructions stored in memory 540.

Also shown in FIG. 5, digital signal processor(s) (DSP(s)) 512 and general-purpose processor(s) 511 may be connected to memory 540 through bus 501. A particular bus interface (not shown) may be integrated with the DSP(s) 512, general-purpose processor(s) 511 and memory 540. In various implementations, functions may be performed in response to execution of one or more machine-readable instructions stored in memory 540 such as on a computer-readable storage medium, such as RAM, ROM, FLASH, or disc drive, just to name a few example. The one or more instructions may be executable by general-purpose processor(s) 511, specialized processors, or DSP(s) 512. Memory 540 may comprise a non-transitory processor-readable memory and/or a computer-readable memory that stores software code (programming code, instructions, etc.) that are executable by processor(s) 511 and/or DSP(s) 512. The processor(s) 511 and/or the DSP(s) 512 may be used to perform various operations as described throughout the specification. For example, the processor(s) 511 and/or the DSP(s) 512 in conjunction with memory 540 may be used to obtain a low power mode indication, and may also be used to identify at least one portion of the display that may be adjusted in response to the power mode indication, similar to block 210. The processor(s) 511 and/or the DSP(s) 512 in conjunction with memory 540 may then determine one or more parameters for the least one portion of a display in response to the low power mode indication, similar to block 220, and then provide content to a display, wherein the at least one portion of the display is based on the one or more parameters, similar to block 230.

Also shown in FIG. 5, a user interface 535 may comprise any one of several devices such as, for example, a speaker, microphone, display device, vibration device, keyboard, touch screen, just to name a few examples. In a particular implementation, user interface 535 may enable a user to interact with one or more applications hosted on mobile device 500. For example, devices of user interface 535 may store analog or digital signals on memory 540 to be further processed by DSP(s) 512 or general purpose processor 511 in response to action from a user. Similarly, applications hosted on mobile device 500 may store analog or digital signals on memory 540 to present an output signal to a user. In another implementation, mobile device 500 may optionally include a dedicated audio input/output (I/O) device 570 comprising, for example, a dedicated speaker, microphone, digital to analog circuitry, analog to digital circuitry, amplifiers and/or gain control. It should be understood, however, that this is merely an example of how an audio I/O may be implemented in a mobile device, and that claimed subject matter is not limited in this respect. In another implementation, mobile device 500 may comprise touch sensors 562 responsive to touching or pressure on a keyboard or touch screen device.

Mobile device 500 may also comprise a dedicated camera device 564 for capturing still or moving imagery. Camera device 564 may comprise, for example an imaging sensor (e.g., charge coupled device or CMOS imager), lens, analog to digital circuitry, frame buffers, just to name a few examples. In one implementation, additional processing, conditioning, encoding or compression of signals representing captured images may be performed at general purpose/application processor 511 or DSP(s) 512. Alternatively, a dedicated video processor 568 may perform conditioning, encoding, compression or manipulation of signals representing captured images. Additionally, video processor 568 may decode/decompress stored image data for presentation on a display device (not shown) on mobile device 500.

Mobile device 500 may also comprise sensors 560 coupled to bus 501 which may include, for example, inertial sensors and environment sensors. Inertial sensors of sensors 560 may comprise, for example accelerometers (e.g., collectively responding to acceleration of mobile device 500 in three dimensions), one or more gyroscopes or one or more magnetometers (e.g., to support one or more compass applications). Environment sensors of mobile device 500 may comprise, for example, temperature sensors, barometric pressure sensors, ambient light sensors, camera imagers, microphones, just to name few examples. Sensors 560 may generate analog or digital signals that may be stored in memory 540 and processed by DPS(s) 512 or general purpose application processor 511 in support of one or more applications such as, for example, applications directed to positioning or navigation operations. The user interface 535, sensors 560, camera(s) 564, touch sensors 562 or any combination thereof may be used to obtain a low power mode indication, and then those components may be used to identify at least one portion of the display that may be adjusted to a lower power in response to the low power mode indication, similar to block 210. The user interface 535, sensors 560, camera(s) 564, touch sensors 562 or any combination thereof may be used to determine one or more parameters for the at least one portion of a display in response to the power mode indication, similar to block 220.

In a particular implementation, mobile device 500 may comprise a dedicated modem processor 566 capable of performing baseband processing of signals received and down converted at wireless transceiver 521 or SPS receiver 555. Similarly, modem processor 566 may perform baseband processing of signals to be upconverted for transmission by wireless transceiver 521. In alternative implementations, instead of having a dedicated modem processor, baseband processing may be performed by a general-purpose processor or DSP (e.g., general purpose/application processor 511 or DSP(s) 512). It should be understood, however, that these are merely examples of structures that may perform baseband processing, and that claimed subject matter is not limited in this respect.

Discussions of coupling between components in this specification do not require the components to be directly coupled. These components may be coupled directly or through one or more intermediaries. Additionally, coupling does not require they be directly attached, but it may also include electrically coupled, communicatively coupled or any combination thereof.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general-purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In another aspect, as previously mentioned, a wireless transmitter or access point may comprise a cellular transceiver device, utilized to extend cellular telephone service into a business or home. In such an implementation, one or more mobile devices may communicate with a cellular transceiver device via a code division multiple access ("CDMA") cellular communication protocol, for example.

Techniques described herein may be used with an SPS that includes any one of several GNSS and/or combinations of GNSS. Furthermore, such techniques may be used with positioning systems that utilize terrestrial transmitters acting as "pseudolites", or a combination of SVs and such terrestrial transmitters. Terrestrial transmitters may, for example, include ground-based transmitters that broadcast a PN code or other ranging code (e.g., similar to a GPS or CDMA cellular signal). Such a transmitter may be assigned a unique PN code so as to permit identification by a remote receiver. Terrestrial transmitters may be useful, for example, to augment an SPS in situations where SPS signals from an orbiting SV might be unavailable, such as in tunnels, mines, buildings, urban canyons or other enclosed areas. Another implementation of pseudolites is known as radio-beacons. The term "SV", as used herein, is intended to include terrestrial transmitters acting as pseudolites, equivalents of pseudolites, and possibly others. The terms "SPS signals" and/or "SV signals", as used herein, is intended to include SPS-like signals from terrestrial transmitters, including terrestrial transmitters acting as pseudolites or equivalents of pseudolites.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Therefore, it is intended that claimed subject matter not be limited to the particular examples disclosed, but that such claimed subject matter may also include all aspects falling within the scope of appended claims, and equivalents thereof.

For an implementation involving firmware and/or software, the methodologies may be implemented with modules (e.g., procedures, functions, and so on) that perform the functions described herein. Any machine-readable medium tangibly embodying instructions may be used in implementing the methodologies described herein. For example, software codes may be stored in a memory and executed by a processor unit. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a computer-readable storage medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

In addition to storage on computer-readable storage medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

What is claimed is:

1. A mobile device, comprising:
   a display;
   a memory;
   one or more processors coupled to the memory and the display, wherein the one or more processors are configured to:
   obtain a navigation route associated with the mobile device;
   identify at least one portion of the display, associated with an application, to occlude based on the navigation route, wherein the at least one portion of the display is less than an entire area of the application;
   generate a content-less mask based on one or more parameters; and
   occlude, via the content-less mask, content of the application associated with the identified at least one portion of the display.

2. The mobile device of claim 1, wherein the one or more processors are further configured to identify the at least one portion of the display, associated with the application, to occlude in response to a power mode indication, battery level, user location, preferences, user usage or any combination thereof.

3. The mobile device of claim 1, wherein the display is further configured to display content corresponding to the application, wherein the at least one portion of the display is displayed at a lower power level compared to an area of the display that corresponds to the application and is not part of the at least one portion of the display.

4. The mobile device of claim 1, wherein the one or more processors are further configured to identify the at least one portion of the display based on predefined areas of the application, custom areas of the application, content of the application, location of the mobile device, user input or any combination thereof.

5. The mobile device of claim 1, wherein the one or more parameters are based on content of the application, pixel patterns, ranking for the at least one portion of the display, visibility needed for the at least one portion of the display, location of the mobile device or any combination thereof.

6. The mobile device of claim 1, wherein the one or more parameters comprise: brightness, opacity, contrast, one or more color levels, luminance, gamma, white balance or any combination thereof.

7. The mobile device of claim 1, wherein the identified at least one portion of the display comprises a second portion of the display and wherein the second portion of the display is occluded based on a second set of parameters.

8. The mobile device of claim 7, wherein the second set of parameters is determined independent from the one or more parameters.

9. The mobile device of claim 1, wherein the at least one portion of the display comprises a shape, size, shape position, coordinates or any combination thereof.

10. A method of a mobile device, the method comprising:
    obtaining a navigation route associated with the mobile device;
    identifying at least one portion of a display, associated with an application, to occlude based on the navigation route, wherein the at least one portion of the display is less than an entire area of the application;
    generating a content-less mask based on one or more parameters; and
    occluding, via the content-less mask, content of the application associated with the identified at least one portion of the display.

11. The method of claim 10, wherein the identifying at least one portion of the display, associated with an application, to occluded further comprises identifying the at least one portion of the display based on a power mode indication, battery level, user location, preferences, user usage or any combination thereof.

12. The method of claim 10, further comprising:
    displaying content corresponding to the application, wherein the at least one portion of the display is displayed at a lower power level compared to an area of the display that corresponds to the application and is not part of the at least one portion of the display.

13. The method of claim 10, wherein the identifying the at least one portion of the display further comprises identifying the at least one portion of the display based on predefined areas of the application, custom areas of the application, content of the application, location of the mobile device, user input or any combination thereof.

14. The method of claim 10, wherein the one or more parameters are based on content of the application, pixel patterns, ranking for the at least one portion of the display, visibility needed for the at least one portion of the display, location of the mobile device or any combination thereof.

15. The method of claim 10, wherein the one or more parameters comprise: brightness, opacity, contrast, one or more color levels, luminance, gamma, white balance or any combination thereof.

16. The method of claim 10, wherein the identified at least one portion of the display comprises a second portion of the display and wherein the second portion of the display is occluded based on a second set of parameters.

17. The method of claim 16, wherein the second set of parameters is determined independent from the one or more parameters.

18. The method of claim 10, wherein the at least one portion of the display comprises a shape, size, shape position, coordinates or any combination thereof.

19. A mobile device comprising:
    means for obtaining a navigation route associated with the mobile device;
    means for identifying at least one portion of a display associated with an application to occlude based on the navigation route, wherein the at least one portion of the display is less than an entire area of the application;
    means for generating a content-less mask based on one or more parameters; and
    means for occluding, via the content-less mask, content of the application associated with the identified at least one portion of the display.

20. The mobile device of claim 19, wherein the means for identifying the at least one portion of the display, associated with the application, to occluded comprises means for identifying the at least one portion of the display based on a power mode indication, battery level, user location, preferences, user usage or any combination thereof.

21. The mobile device of claim 19, further comprising:
    means for displaying content corresponding to the application, wherein the at least one portion of the display is displayed at a lower power level compared to an area of the display that corresponds to the application and is not part of the at least one portion of the display.

22. The mobile device of claim 19, wherein the means for identifying the at least one portion of the display comprises means for identifying the at least one portion of the display based on predefined areas of the application, custom areas of the application, content of the application, location of the mobile device, user input or any combination thereof.

23. The mobile device of claim 19, wherein the one or more parameters are based on content, pixel patterns, ranking for the at least one portion of the display, visibility needed for the at least one portion of the display, location of the mobile device or any combination thereof.

24. The mobile device of claim 19, wherein the one or more parameters comprise: brightness, opacity, contrast, one or more color levels, luminance, gamma, white balance or any combination thereof.

25. The mobile device of claim 19, wherein the identified at least one portion of the display comprises a second portion of the display and wherein the second portion of the display is occluded based on a second set of parameters.

26. The mobile device of claim 25, wherein the second set of parameters is determined independent from the one or more parameters.

27. The mobile device of claim 19, wherein the at least one portion of the display comprises a shape, size, shape position, coordinates or any combination thereof.

28. A non-transitory computer-readable medium comprising processor-executable program code configured to cause a processor to:
    obtain a navigation route associated with the mobile device;
    identify at least one portion of the display, associated with an application, to occlude based on the navigation route, wherein the at least one portion of the display is less than an entire area of the application;

generate a content-less mask based on one or more parameters; and occlude, via the content-less mask, content of the application associated with the identified at least one portion of the display.

29. The non-transitory computer-readable medium of claim 28, wherein the process-executable program code is further configured to cause the processor to identify the at least one portion of the display, associated with the application, to occlude based on a power mode indication, battery level, user location, preferences, user usage or any combination thereof.

30. The non-transitory computer-readable medium of claim 29, wherein the process-executable program code is further configured to cause the processor to identify the at least one portion of the display based on predefined areas, custom areas, the content, location, user input or any combination thereof.

* * * * *